Figure 9:
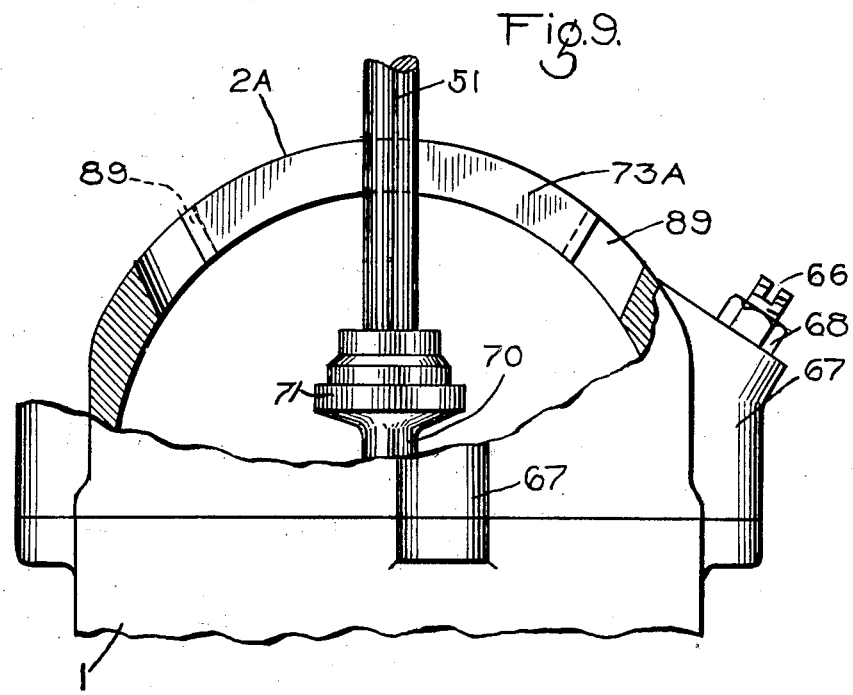

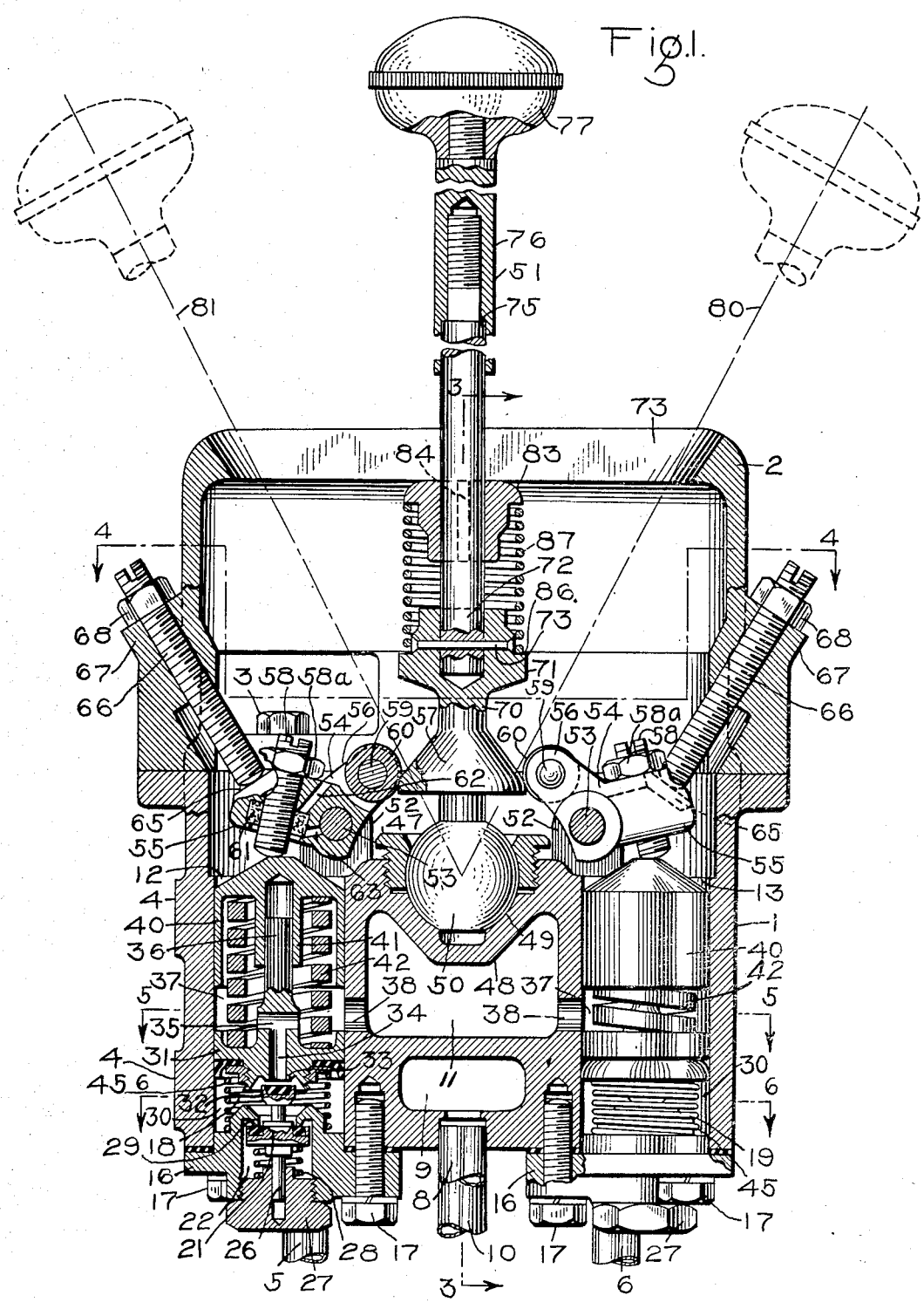

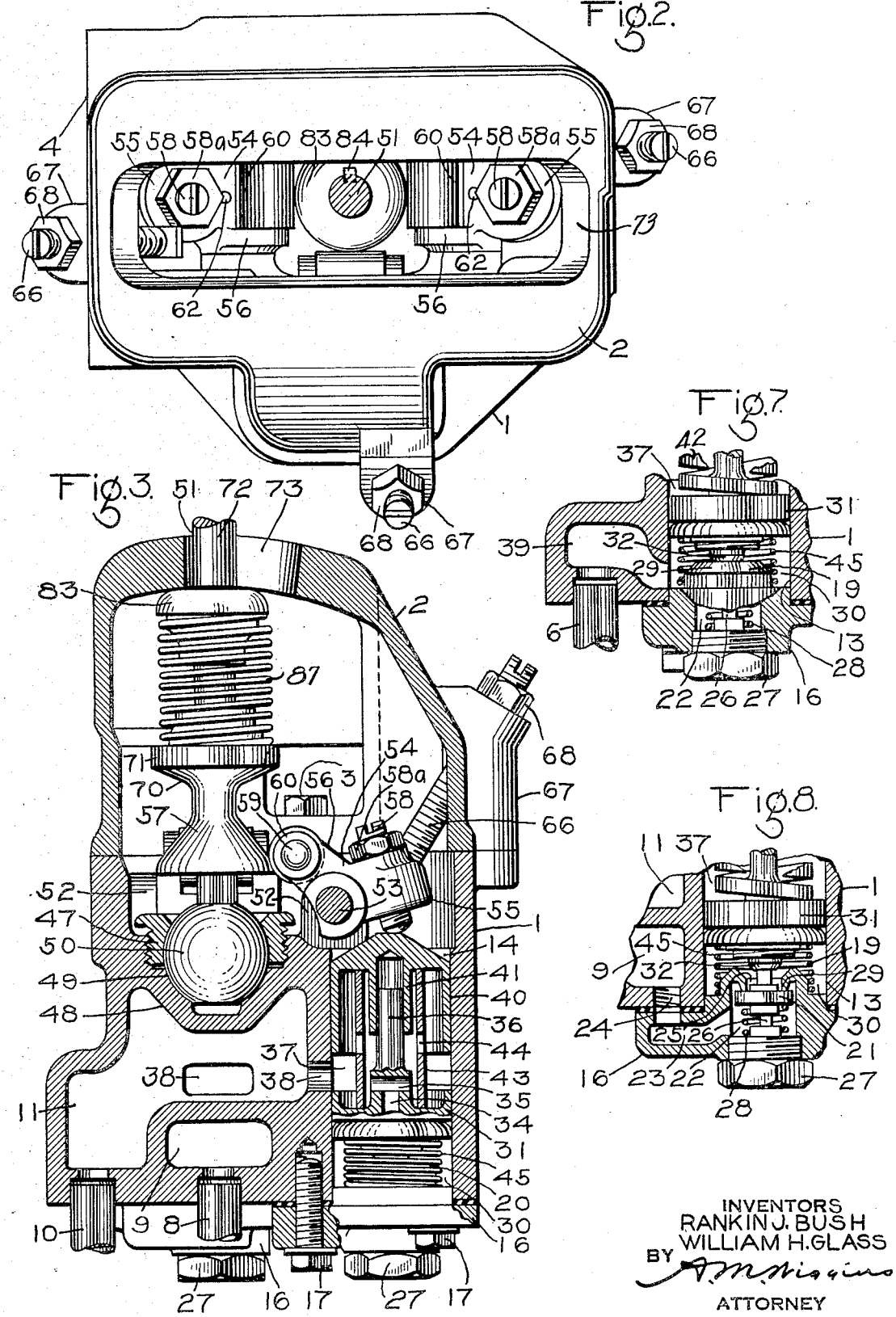

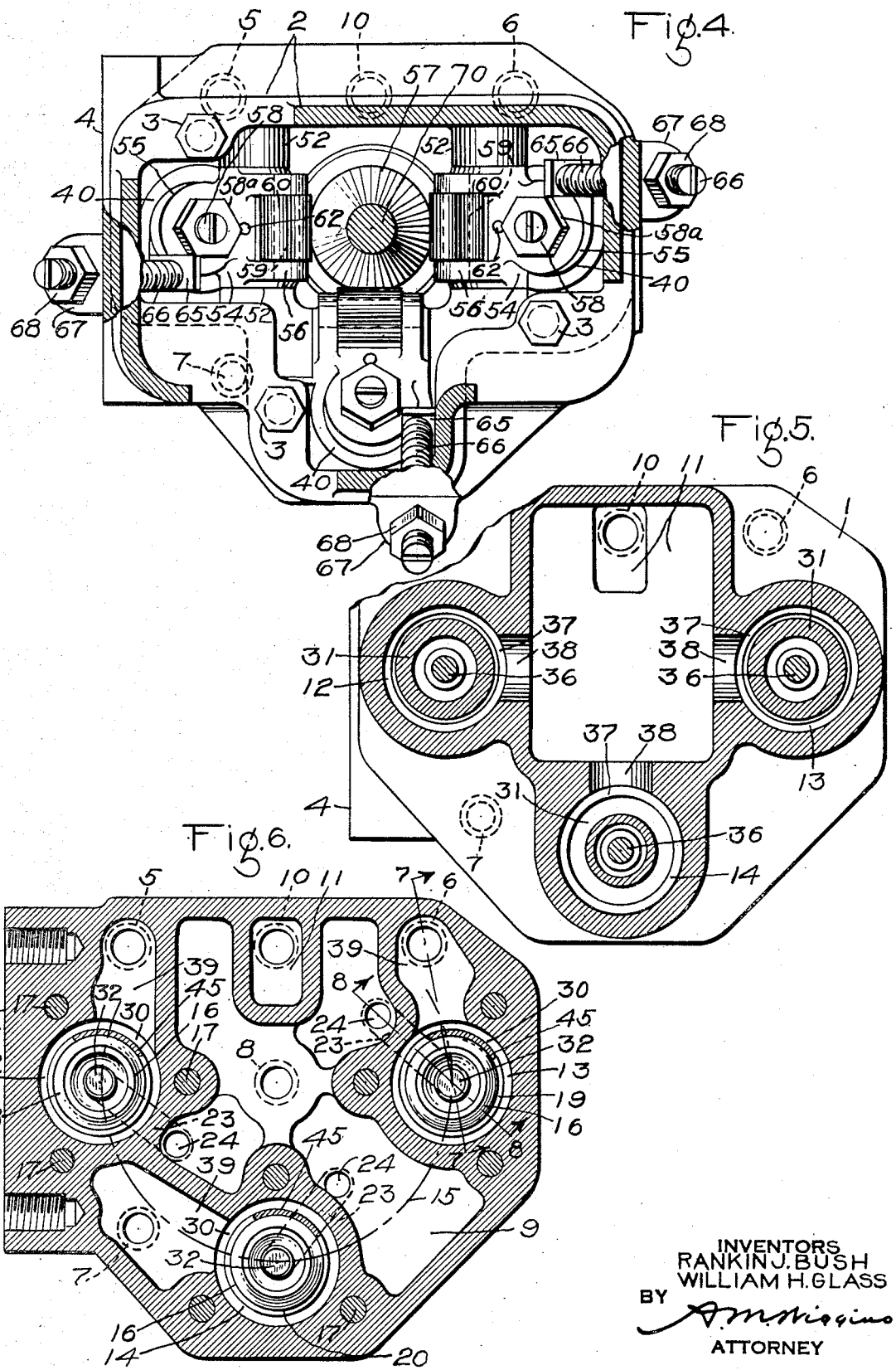

INVENTORS
RANKIN J. BUSH
WILLIAM H. GLASS
BY
ATTORNEY

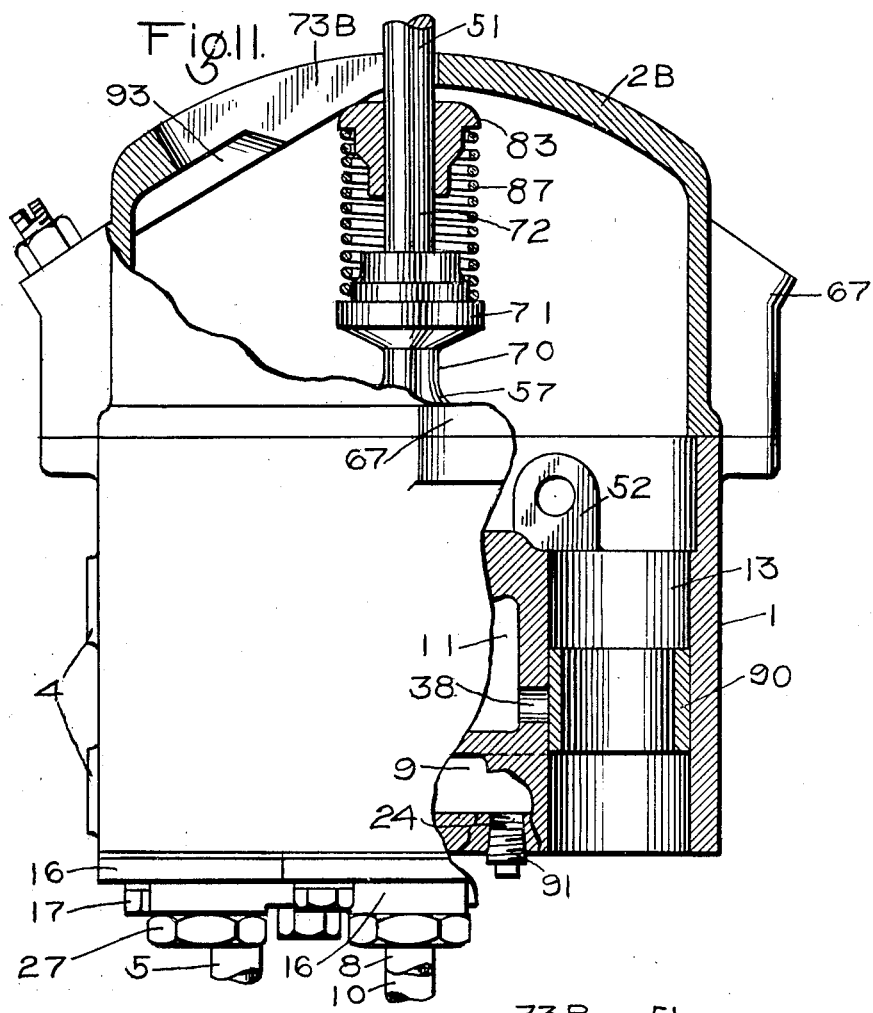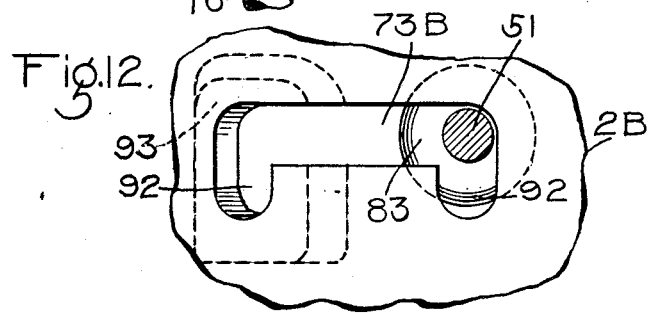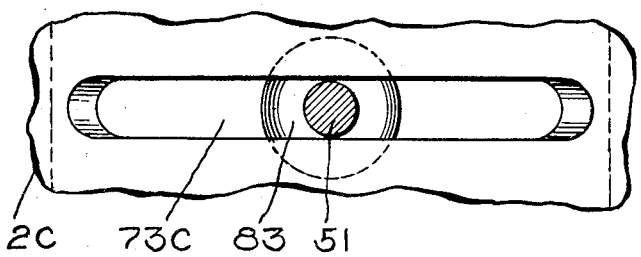

Patented Sept. 21, 1943

2,329,742

UNITED STATES PATENT OFFICE 2,329,742

CONTROL MECHANISM

Rankin J. Bush, Jeannette, and William H. Glass, Pittsburgh, Pa., assignors to The Westinghouse Air Brake Company, Wilmerding, Pa., a corporation of Pennsylvania Application June 28, 1941, Serial No. 400,266

23 Claims. (Cl. 303—52)

This invention relates to fluid pressure control mechanism and more particularly to manually operative controllers for selectively controlling the operation of a plurality of remotely positioned actuators.

In many machines, such as power shovels or excavating machines, the selective operation of a plurality of actuators, such as air operated cylinders or clutches, is required for controlling various movements and operations of different parts. For instance actuators are required for urging the boom in one direction or the other, for raising the boom, for braking the boom-carrying table when the boom is in a desired position for hoisting and lowering the shovel or bucket, for releasing a load therefrom, for crowding the bucket against the material being excavated and for retracting same, and for steering the machine during movement over the ground. Under certain conditions it may be desired to operate two or more actuators at the same time as for crowding, hoisting and swinging the bucket. It may also be desirable to cause one actuator to operate at a maximum degree before rendering a second effective or it may be desirable to operate said second actuator when the first is operating at any chosen degree of effectiveness. To properly control certain operations it may further be desirable to prevent the complete release of an actuator or in other words to maintain a constant relatively small degree of drag on a clutch as for example to hold the bucket of a power shovel in a relatively stationary position with respect to the boom against the action of gravity tending to urge the bucket downwardly.

As is well known, there are numerous machines requiring a plurality of actuators and different machines embody different members requiring a multiplicity of different types of control to obtain selected movements or operations and one object of the invention is the provision of an improved manually operative controller particularly adapted for selectively controlling a plurality of actuators for controlling such movements or operations.

Another object of the invention is the provision of an improved manually operative controller for a plurality of actuators which is so constituted that an operator with a minimum of effort and difficulty may selectively and positively control the graduated supply of fluid under pressure to and the graduated release of fluid under pressure from the actuators to obtain any desired degree of operation of the actuators.

Where an actuator controls a device such as a clutch, it is desirable in certain instances to control the initial portion of clutch engagement, or of clutch slipping, with great accuracy in order to obtain very sensitive positioning or operation of the element being controlled. After a certain degree of clutch engagement however, the further engagement does not need be so sensitive, and another object of the invention is the provision of an improved controller adapted to readily produce these results with a minimum degree of difficulty and judgment on the part of the operator.

The improved controller embodies an operating lever or handle having a normal or neutral position for releasing the actuator or actuators controlled thereby and movable through an arc to effect operation of a selected actuator to a degree dependent upon the extent of movement from normal position.

Another object of the invention is the provision of improved means for holding the operating handle in any position out of neutral without manual effort.

Another object of the invention is the provision of an improved controller so arranged as to provide for the selective operation of either one of a plurality of actuators or providing for the operation of one actuator while causing operation of another to any degree.

In the application of the invention to various machines, several of the controllers may be employed on one machine. One controller may for instance be used for controlling one or more of several operations, while another controller may be used to control certain other operations. The improved controller therefore comprises a body adapted to contain a plurality of valve arrangements each of which is adapted to control one actuator. Mounted on this body is a cover and projecting through an opening in the cover is a lever for operating the valve arrangement, the configuration of said opening determining the number of valve arrangements in the body to be controlled and the manner of such control. According to a further concept of the invention there may be provided a plurality of bodies differing only in the number of valve arrangements adapted to be contained therein and from which one or more of the valve arrangements may be omitted, depending upon the number of actuators to be controlled. For each of these bodies there may be provided a plurality of covers having handle operating openings corresponding to the number of valve arrangements to be controlled and of such configuration as to determine the type of such control. By this concept the combination of one or another of the bodies with one or another of the respective covers will provide any desired type of control for a selected actuator or plurality thereof, as will be apparent.

More specifically, the invention constitutes novel additions to or modifications of controllers of the general type disclosed in U. S. Patent 2,157,592 issued on May 9, 1939, to R. H. Casler whereby an operator may readily control, in a most efficient and effective manner certain operations or movements in machines which Casler did not contemplate and for which the Casler structure is not particularly adapted.

Other objects and advantages will be apparent from the following more detailed description of the invention.

Figure 10:
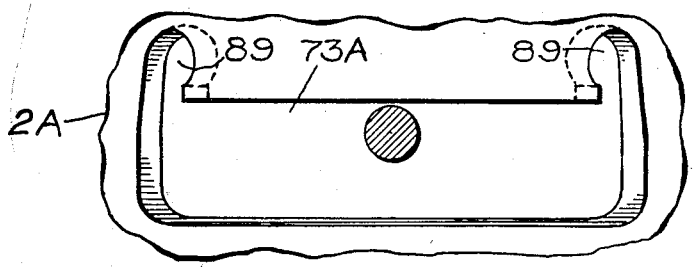

In the accompanying drawings; Fig. 1 is a vertical sectional view through one form of the improved controller; Fig. 2 is a plan view of the controller shown in Fig. 1; Figs. 3 to 6 are sectional views taken on the lines 3—3, 4—4, 5—5 and 6—6 in Fig. 1; Figs. 7 and 8 are sectional views taken on the lines 7—7 and 8—8 in Fig. 6; Figs. 9 and 10 are respectively a partial sectional view and plan view of a modification of the invention shown in Figs. 1 to 8; Fig. 11 is a side elevational view of a controller similar to that shown in Fig. 1 and having certain parts broken away to show interior construction; Fig. 12 is a partial plan view of the controller shown in Fig. 11; and Fig. 13 is a partial plan view of still another embodiment.

Description—Figs. 1 to 8

As shown in the drawings, the invention is illustrated in a manually operative controller adapted for selectively controlling fluid under pressure to three actuators, the controller comprising a body 1 to the upper face of which is adapted to be removably applied any one of a plurality of different covers such as a cover 2 shown in Figs. 1 to 4, a cover 2A shown in Figs. 9 and 10; a cover 2B shown in Figs. 11 and 12 on a cover 2C shown in Fig. 13; the cover employed or the body determining the number of actuators to be controlled and the manner of such control.

The body has on one side bosses 4 for mounting the controller on a machine with which it is adapted to be employed. To the lower face of the body 1 are connected pipes 5, 6 and 7 which are adapted to lead to three remotely located actuators, such as air controlled cylinders for operating clutches which are not shown in the drawings since they are not deemed essential to an understanding of the invention. A fluid pressure supply pipe 8 is also connected to the lower face of body 1 and is open to a cavity 9 formed therein. The pipe 8 is adapted to be connected with any suitable source of fluid under pressure (not shown) so that the cavity 9 will be constantly supplied with fluid under pressure when the controller is in use. A fluid pressure release or exhaust pipe 10 is also connected to the lower face of body 1 and is open to an exhaust cavity 11 formed in the body whereby said cavity may be in constant communication with the atmosphere.

The body 1 has three bores 12, 13 and 14 extending parallel to each other between the top and bottom faces of the body, these bores being arranged with their axes on a circle indicated by the reference numeral 15 in Fig. 6, the bores 12 and 13 being diametrically opposite each other and the bore 14 arranged 45° from the other bores.

The lower end of each of the bores 12, 13 and 14 is closed by a cover 16 secured to the lower face of the body 1 by screws 17. Each of these bores and the associated cover is provided to contain a fluid pressure supply and release valve mechanism for controlling an actuator, the several bores in the embodiment shown in Figs. 1 to 8 containing valve mechanism 18, 19 and 20, respectively.

Each of the valve mechanisms 18, 19 and 20 comprises a fluid pressure supply valve 21 which is contained in a chamber 22 formed in the cover 16 and in constant communication with the fluid pressure supply cavity 9 in the body through a passage 23 in said cover and a port 24 in said body, as shown in Figs. 6 and 8. Each cover 16 is provided at its inner end with an annular valve seat 29 formed around a passage 25 and provided for sealing engagement with the valve 21. Each of the valves 21 is mounted on a stem 26 which below the valve is slidably mounted in a suitable guide bore provided in a cap nut 27 secured to the cover 16 by screw-threaded engagement for closing the lower end of chamber 22. Encircling stem 26 in chamber 22 is a coil spring 28 which acts on the valve 21 for urging same into engagement with the seat rib 29.

In each valve mechanism 18, 19 and 20 the stem 26 extends from the upper face of the valve 21 through passage 25 and into a chamber 30 formed below a piston 31 which is slidably mounted in the bore. The chambers 30 in the several valve mechanisms 18, 19 and 20 are in constant communication with pipes 5, 6 and 7, respectively, by way of passages 39 formed in body 1 and each contains a relatively light bias spring 45 acting on the piston 31 therein for urging same to the position shown. On the upper end of each stem 26 is an exhaust valve 32 which is arranged to cooperate with an annular valve seat 33 formed on the lower face of piston 31 to close communication between chamber 30 and an axial bore 34 in said piston. Each bore 34 is open at its upper end to a cross-bore 35 in a stem 36 extending from the upper face of piston 31 into a chamber 37. The bore 35 in each piston connects bore 34 therein to chamber 37 at the upper side of the piston which is in constant communication with the exhaust cavity 11 in the body by way of a passage 38.

Slidably mounted in each of the bores 12, 13 and 14 above the pistons 31 is a plunger 40 and projecting centrally from the lower or inner face thereof is a sleeve-like extension 41 in which stem 36 of the piston 31 in the bore is slidably mounted.

In each of the valve mechanisms 18 and 19 a coil spring 42 is disposed in chamber 37 above the piston 31 and bears at one end on the plunger 40 and at the opposite end on the piston 31. The valve mechanism 20 may be like the valve mechanisms 18 and 19, but preferably differs therefrom in that a rigid spacer sleeve 43 is disposed in chamber 37 in place of a spring 42, said sleeve bearing at one end against the plunger 40 and at the opposite end against the piston 31 of said mechanism. The sleeve 43 is provided with one or more openings 44 through the side wall thereof for establishing communication between passage 35 in the piston stem 36 and chamber 37 at the upper face of the piston which is open through passage 38 to the exhaust cavity 11.

As will be noted, the valve mechanisms 18 and 19 embodying the control springs 42 constitute what are known as self-lapping valve mechanisms which are adapted to provide various degrees of fluid pressure in a receiver depending upon the degree of movement of a control element, such as plungers 40 in the illustration. However, in the valve mechanism 20 the use of the rigid spacer sleeve 43 in place of a spring such as 42, prevents this valve mechanism from operating on the self-lapping principal. In other words, the valve mechanism 20, as illustrated, merely constitutes a device for either supplying fluid under pressure to a receiver or for releasing fluid under pressure therefrom independently of the degree of pressure of such fluid.

The top of the exhaust cavity 11 is defined by a wall 48 adjacent the upper portion of the body and in the outer part of this wall there is formed one part of a socket 49 which is coaxially aligned with the center of circle 15. The ball end 50 of an operating lever 51 is disposed in socket 49 and over the lever is mounted a retainer nut 47 having screw-threaded engagement with the wall 48. The retainer nut 47 has centrally an opening shaped to fit the ball end 50 of the lever and to engage same above its center. This ball and socket connection between the lower end of the lever 51 and the body 1 provides for universal movement of the lever, as will be apparent.

Between each of the bores 12, 13 and 14 and the retainer nut 47 the body 1 is provided with two upstanding lugs 52 which are spaced apart and carry a pin 53 extending at right angles to the axis of said bore but spaced inwardly therefrom. A bell crank 54 is rockably mounted on each of the pins 53 and has one arm 55 disposed above one of the plungers 40 and another arm 56 which extends in the direction of a conical shaped cam 57 provided on the operating stem immediately above the ball end 50. An adjusting screw 58 is threaded through the arm 55 of each bell crank for engagement with the upper end of the adjacent plunger 40 and on each screw is a lock nut 58a adapted to engage said arm for securing the screw in an adjusted position. The arm 56 of each bell crank is bifurcated and extending between the two parts thereof is a pin 59 on which is journaled a roller 60 which is adapted to contact the conical surface of cam 57.

In the arm 55 of each bell crank is an annular recess 61 encircling the adjusting screw 58 and packed with lubricant carrying material and this recess is open by a passage 62 to the upper surface of the arm adjacent the roller 60 and by another passage 63 to pin 53. Through these passages and downwardly along the adjusting screw 58 of each bell crank lubricant is adapted to be conveyed by capillary action from the packing in the recess 61 to the bearing between said screw and the plunger 40 and the bearing on pin 53 and between the pin 59 and roller 60.

Each bell crank 54 is provided with an extension or stop 65 projecting from the arm 55 adjacent the end thereof for contact with an adjusting screw 66 which is threaded through a boss 67 associated with the cover 2. Each of the adjusting screws 66 extend to the exterior of the cover where a lock nut 68 is provided on the screw for engagement with the end of the respective boss 67 for securing the screw in an adjusted position.

The manual operating lever 51 comprises inside of the cover 2 a portion 70 on which the cam 57 is formed and which has its lower end secured in the ball 50. The upper end of this part of the lever is provided with an annular enlarged portion 71 having an axial bore into which is pressed one end of a rod 72, a rivet 73 being provided through the telescoped parts for securing them together. The rod 72 extends through a slot 73 in the cover 2 and is rigidly connected by screw-threaded contact and by engaging shoulders 75 with an extension 76 on the outer end of which is provided a knob 77 which the operator is adapted to grasp for operating the device.

The slot 73 in cover 2 is relatively long, as viewed in Figs. 1 and 2 to provide for movement of the operating lever 51 from a normal neutral position shown in either direction to positions indicated by the lines 80 and 81. The slot 73 is also of such width, as shown in Figs. 2 and 3 as to provide for a certain degree of lateral movement of the operating lever 51 from its normal position in which it is shown, regardless of the disposition of the lever longitudinally of the slot.

Slidably mounted on the operating lever 51 within the cover 2 is a friction shoe 83 having an upper surface which is curved to substantially fit the inner contour of cover 2 crosswise of the cover, as shown in Fig. 3. The shoe 83 is secured to the rod 72 against turning thereon by a key 84 held in a suitable slot in the rod and extending into a slot in the shoe, the shoe being slidable on the rod relative to this key. The enlarged portion 71 of the lower part 70 of the operating lever is provided with an annular spring seat 86 which supports one end of a coil spring 87 the opposite end of which engages the lower face of the friction shoe 83. This spring is under compression for urging the shoe 83 against the cover 2 in all positions which the operating lever 51 may assume within the slot 73.

*Operation—Figs. 1 to 8*

In operation, let it be assumed that the operating lever 51 is initially in its normal position shown in Figs. 1 to 4. Let it be further assumed that the adjusting screws 66 are so adjusted as to permit the rollers 60 on bell cranks 54 to just contact the conical surface of cam 57 and that the adjusting screws 58 in the bell cranks are so adjusted that in the valve mechanisms 18 and 19 the relatively light springs 45 acting on the pistons 31 will be permitted to hold said pistons and thereby the control springs 42 and plungers 40 in the positions shown in Fig. 1 in which the plungers are in contact with the adjusting screws and in which the seat ribs 33 associated with the pistons 31 are moved away from the exhaust valves 32 a chosen distance. With the adjusting screw 58 in the bell crank associated with the valve mechanism 20 similarly adjusted the spring 45 therein will hold the piston 31 in a similar position so that the exhaust valve 32 of this valve mechanism will also be unseated. With the several exhaust valves 32 thus unseated the several pipes 5, 6 and 7 connected to the actuators to be controlled will be opened through the ports 34 and 35 in the pistons 31 to chambers 37 thence through ports 38 to the exhaust chamber 11 which is open to the atmosphere so that said actuators will be ineffective.

When the several exhaust valves 32 are unseated the supply valves 21 will be seated under the action of springs 28, so that fluid supplied by way of supply pipe 8 and cavity 9 to the several supply valve chambers 22 will be bottled therein.

Now let it be assumed that it is desired to supply fluid under pressure only to pipe 5 for operating a certain actuator. In order to accomplish this, the operator grasps the knob 77 and moves same in the direction of the left hand, as viewed in Fig. 1. The consequent rocking of the operating lever 51 and cam 57 effects rocking of the bell crank 54 associated with the valve mechanism 18 in a counterclockwise direction thereby urging the plunger 40 of said mechanism in a downwardly direction.

This movement of the plunger 40 of the valve mechanism 18 acts through the control spring 42 on the piston 31 and when the pressure of said spring exceeds that of spring 45 in valve chamber 30, said piston is moved into contact with the exhaust valve 32 for closing the exhaust communication from chamber 30 which is open to pipe 5. Further downward movement of plunger 40 in valve mechanism 18 then acts through the exhaust valve 32 and stem 26 to unseat the supply valve 21 from the seat rib 29. Fluid under pressure from the supply pipe 8 supplied to chamber 22 in the valve mechanism 18 then flows past the supply valve 21 to chamber 30 and thence to pipe 5 for operating the actuator connected thereto.

When the pressure of fluid thus obtained in pipe 5 and chamber 30 and acting on the piston 31 is increased by the supply past valve 21 to a degree which slightly exceeds the opposing pressure of the control spring 42 on said piston, said piston is moved upwardly to permit seating of the supply valve 21 by spring 28 to thereby limit the pressure of fluid obtained in the pipe 5 for operating the actuator connected thereto to a degree depending upon the pressure of the control spring 42, as determined by the position of the plunger 40 in bore 12. Thus a relatively slight degree of movement of the operating lever 51 from normal position in the direction of the left hand in slot 73 will provide a certain limited degree of pressure in pipe 5. Further movement of the lever in slot 73 in the same direction will cause a corresponding increase in pressure in pipe 5, while movement to the position indicated by line 81 will provide a maximum degree of actuating pressure in the pipe 5. In other words, the extent of movement of the operating lever 51 from normal position determines the pressure of the control spring 42 which in turn determines the pressure obtained in the pipe 5, as will be apparent.

When the operator desires to release fluid under pressure from the pipe 5 to reduce the effectiveness of an actuator or to render it ineffective, he moves the operating lever 51 from the position to which it was moved to cause operation of the actuator in the direction of the right hand, as viewed in Fig. 1. As the lever 51 is thus returned toward its normal position the pressure of the cam 57 on the bell crank is relieved which permits the control spring 42 to expand by moving the plunger 40 upwardly thereby reducing its force on the piston 31. When the pressure of the control spring is thus reduced on piston 31 in the valve mechanism 18, the fluid pressure from pipe 5 acting in chamber 30 moves the piston 31 in an upwardly direction away from the exhaust valve 32 which then permits the release of fluid under pressure from pipe 5 and chamber 30. Fluid under pressure is thus released until the pressure in pipe 5 and chamber 30 becomes reduced to a degree slightly below that of the control spring 42, in case the control spring is not fully released, and when this occurs said spring moves the piston 31 back into engagement with the exhaust valve 32 to prevent further release of fluid under pressure from the pipe 5. By limiting the degree of movement of the operating lever 51 back toward its normal position and thereby limiting the reduction in pressure of spring 42 on the piston 31 a corresponding reduction in the pressure of fluid in the control pipe 5 may be obtained. In case the lever 51 is returned to the neutral position the pressure of spring 42 will however be so reduced that the bias spring 45 will be rendered effective to maintain the piston 31 in the position shown to provide for complete release of fluid under pressure from the pipe 5.

It will thus be apparent that the pressure of fluid provided in pipe 5 for controlling one actuator can be increased or graduated in any desired increments or steps up to a chosen maximum degree and likewise reduced, by the proper positioning of the operating lever 51 between the normal position shown and the position indicated by line 81.

If it is desired to effect operation of the actuator connected to pipe 6 the operating lever 51 may be moved from the neutral position shown in the direction of the right hand to any position up to line 80 and in the opposite direction to any desired position back to neutral to thereby cause operation of the valve mechanism 19 to vary the pressure of fluid in said pipe in identically the same manner as that in pipe 5 was varied, as above described.

It will now be apparent that by the selective movement of the operating lever 51 in either one direction or the other from neutral position the graduated operation of a selected actuator may be readily controlled. Assume that the actuators controlled through pipes 5 and 6 operate clutches to swing a boom in one direction or another. In order to control the boom with a maximum degree of accuracy it is desirable that the operator be able to accurately control and vary the pressure between the driving and driven parts of the operating clutch which determines slippage in the clutch and thereby the sensitivity of the parts to provide exact positioning of the member being operated. In order to accomplish this end the surface of the cam 57 over which the rollers 60 operate is made substantially straight so as to obtain a relatively small degree of rocking of the bell cranks during the major portion of movement of the operating lever 51 from neutral position. By this arrangement a very sensitive control and accurate positioning of a device such as a boom is made possible without a great degree of accuracy in the postioning of the operating lever 51 and thus with a minimum of difficulty and judgment of the part of an operator.

After a clutch is engaged to a degree determined by this preliminary movement of lever 51, there is no further need for fine and accurate adjustment of pressure changes in the actuator. As a result, during the remainder and relatively small degree of movement of the lever to the full pressure position, indicated by lines 80 and 81, a relatively greater increase in pressure is provided in the actuating pipes than is obtained during the relatively greater preliminary movement of the levers.

In any position of the operating lever 51 in slot 73 longitudinally thereof, it is capable of being rocked cross-wise of the slot for thereby operating the valve mechanism 20 through the associated bell crank 54. When pressure is applied to plunger 40 in valve mechanism 20 said plunger merely acts through the spacer sleeve 43 on piston 31 to effect movement thereof into contact with the exhaust valve 32 and to then unseat the fluid pressure supply valve 21 for supplying fluid under pressure to the pipe 7. The valve 21 will thus be maintained unseated as long as the operating lever 51 is held in its lateral position, but upon movement of said lever back to normal position the pressure of fluid in the pipe 7 acting in chamber 30 below piston 31 of said valve mechanism is adapted to return said piston to its normal position to thereby provide for closing of the fluid pressure supply valve 21 and opening of exhaust valve 32 for releasing fluid under pressure from the pipe 7. The valve mechanism 20 is thus operative merely to supply fluid under pressure to the pipe 7 and to release fluid under pressure therefrom and is not operative to automatically graduate the degree of pressure obtained in said pipe, as are the valve mechanisms 18 and 19. This, however is considered satisfactory for certain operations such as for actuating a brake on a boom carrying table to arrest turning movement. It will be noted that this brake can be thus operated at any time, that is, regardless of the position of the operating lever 51 longitudinally of the slot 73 and whether either of the valve mechanisms 18 or 19 is operating at the time.

When the operating lever 51 is rocked to operate one of the bell cranks 54 the lower edge of the cam 57 i. e., the edge at the base of the cam opposite the bell crank being operated, will move out of contact with roller 60 on the diametrically opposite bell crank. The adjusting screw 66 becomes effective at this time to hold the non-operating bell-crank against such rocking as would move the roller into the path of movement of the cam 57 upon return thereof to its normal or neutral position. In other words, the adjusting screws 66 are adapted to hold the non-operating bell crank in such position that the cam 57 upon return of the operating handle 51 to its neutral position may return into operative relation with such bell crank.

There is a second important reason for the adjusting screws 66. These screws limit the upward movement of members 40 which control the release of fluid under pressure from the connected actuating pipes and therefore in the valve mechanisms 18 and 19, as well as in the valve mechanism 20 if a spring 42 is used in place of sleeve 43, one or more of these screws may be adjusted inwardly of the cover to limit upward movement of the respective plunger 40 to such a degree as will prevent a complete release of fluid under pressure from the connected actuating pipes 5, 6 or 7. By the proper adjustment of one or more of these screws a certain minimum pressure may therefore be constantly maintained in the connected pipes 5, 6 or 7 to provide a chosen degree of drag on, for instance, a clutch being controlled, to secure a desired operation.

When any of the valve mechanisms 18, 19 and 20 are operated to supply fluid under pressure to their connected pipes such pressure reacts through the pistons 31, plungers 40 bell cranks 54 and cam 57 tending to return the operating lever 51 from its operating position to its neutral position. In the present embodiment it is desirable that the lever 51 remain in a selected position longitudinally of the slot 73 without the use of manual effort to counteract the pressure of fluid on piston 31 just described and to accomplish this the friction shoe 83 is provided.

It will be noted that this shoe is constantly urged into frictional contact with the inside surface of cover 2 by the spring 87, and that when the lever 51 is moved away from neutral position only a component of the force of this spring is effective to oppose return of the lever to neutral position. This component however acting in conjunction with the angularity of the lever with respect to the inside surface of the cover longitudinally of the slot is such as to create sufficient friction between said surface and shoe 83 as to positively hold the lever in any desired selected position lengthwise of the slot from neutral position.

In Fig. 3 it will be seen that when with lever 51 is in the position adjacent the side of slot 73 in which the valve mechanism 20 is not being operated, the shoe 83 is substantially free of the cover at the opposite side of the slot, so that the force for holding the lever in a selected position out of neutral is obtained between the shoe and cover only at the one side of the slot and therefore at one side of the lever. This force obviously would tend to rotate the shoe 83 on the lever 51 so that the shoe would fail to act as intended. The key 84 however secures the shoe against such rotation so as to attain the desired locking action.

In the present embodiment it is not desired that the lever remain in the lateral position causing operation of the valve mechanism 20 except under manual pressure. The contour of the inner surface of the cover in a direction transversely of the slot 73 and which will be engaged by the shoe 83 when the valve mechanism 20 is being operated is therefore so formed that the force of the shoe 83 against same will automatically return the lever to the opposite side of the slot when the lever is relieved of manual force.

*Description—Figs. 9 and 10*

Assuming that the valve mechanisms 18 and 19 are connected for controlling the crowding and retracting of a power shovel bucket into and away from, respectively, material being excavated, and that the valve mechanism 20 is connected for controlling the release of material from the bucket, a cover 2A shown in Figs. 9 and 10 may be used on body 1 in place of cover 2, the cover 2A being more particularly adapted to a use of this specific type.

The cover 2A has a slot 73A which is rectangular in shape like slot 73 in cover 2 so as to provide for the same selective operation of the valve mechanisms 18, 19 and 20 as obtained with cover 2. However in this structure there is no friction shoe 83 for holding the lever 51 in an intermediate operating position like obtained by the use of friction shoe 83 in connection with cover 2. The operator must therefore hold the lever in a selected position in cover 2A while performing a selected operation. When the operation is completed the operator may let go of the handle and it will be automatically returned to neutral position by the pressure of fluid acting on the piston 31 in the valve mechanism 18, 19 or 20 being operated.

The cover 2A has however two notches 89 open through the side of slot 73A which is closest to the lever 51 when in neutral position. One of these notches is located at each end of the slot 73a and both are hooked shaped in the direction of the top of the cover. Those notches are provided to receive and hold without manual effort the lever 51 in either of the positions for causing operation of either of the valve mechanisms 18 or 19 to provide their maximum degrees of pressure at their connected actuators. This feature is desirable in this particular use in order that the operator may let go of the handle while the bucket is being crowded or retracted so as to be able to operate with the same hand another device to for instance cause simultaneous hoisting of the bucket.

Description—Figs. 11 and 12

The controller disclosed in Figs. 11 and 12 is particularly adapted for use in cases where it is desired to selectively control the operation of either of two actuators or the sequential operation of first one and then another. In this device the valve mechanism 19 is omitted from bore 13 in body 1 and a bushing 90 is pressed into said bore to close communication between the exhaust cavity 11 in the body and said bore so that fluid under pressure released to said cavity by the valve mechanisms 18 and 20 can escape to atmosphere only through the exhaust pipe 10 which carries such exhaust away from the operator. The cap 16 is left off the body over the lower end of bore 13 and a plug 91 is placed in port 24 in the body to prevent loss of fluid under pressure from the fluid pressure supply cavity 9.

In this embodiment a cover 2B is mounted on the body 1, this cover having a slot 73B extending from neutral position of the lever only in a direction which provides for operating the valve mechanism 18. At each end of slot 73B there is a shorter slot 92 which provides for lateral movement of lever 51 to operate the valve mechanism 20. It will be noted that either valve mechanism 18 or 20 may be individually operated or both can be operated at the same time by first moving the lever 51 to the left hand end of slot 73B, as viewed in the drawings and then into the slot 92 at said end.

In this embodiment the friction shoe 83 is mounted on the lever and at the left hand end of slot 73B there is a cavity 93 for receiving said shoe 83 to hold the lever in this extreme position without the use of manual effort. The lever must be operated to release the shoe 83 from cavity 93 following which said lever will automatically return to neutral. As shown in Fig. 12 the cavity 93 is elongated transversely of the cover so that the lever 51 may be moved into the slot 92 without opposition by the shoe 83. The lever is automatically movable out of both slots 92 upon the relief of manual effort by the fluid pressure acting on the piston 31 of valve mechanism 20.

In this embodiment the shoe 83 is not keyed to the lever 51 against turning since there is no such tendency, as will be apparent.

Description—Fig. 13

A controller of the above general type might be desired which embodied only the valve mechanisms 18 and 19 in which case the valve mechanism 20 would be omitted as well as cover 16 over the lower end of bore 14 and in said bore would be placed a bushing 90, and a plug 91 would be placed in the fluid pressure supply port 24 for said bore.

With such a controller the lever 51 need be movable only in one plane, as will be apparent, and to meet this condition a cover 20 would be employed on the body 1.

The cover 20 may differ from cover 2 only in that the slot 73C is relatively narrow so that the lever is movable only longitudinally of the slot. With this cover the friction shoe 83 need not be keyed to the lever against turning since there is no such tendency on account of the shoe having a substantially equal amount of surface in contact with the cover at both sides of the lever.

Conclusion

It will now be apparent that by the use of a single valve body, adapted to contain one or more valve assemblies, and a suitable cover, a selector valve device or controller is provided for an operator to selectively control actuators, corresponding in number to the number of valve assemblies in the body, in a manner dependent upon the configuration of the shifting slot in the selected cover used with the body and whether said cover is designed either for locking the shifting lever in one or more selected positions or to cooperate with the friction shoe for holding the lever in any position out of neutral.

The improved controller provides for very flexible or fine graduated control of any one of a plurality of actuators whereby a desired operation may be effected with exactness and with a minimum of difficulty or judgment on the part of an operator.

As before pointed out applicants are aware that selector valves or controllers of the general type disclosed in the drawings are old, but believe that patentable novelty exists in the particular modifications or additions, above described and hereinafter claimed whereby a device is produced which is particularly suited to control the operation of one or more actuators in a manner specific to any machine with which the controller may be associated.

Having now described our invention, what we claim as new and desire to secure by Letters Patent, is:

1. A controller for selectively varying the pressure of fluid in a pipe comprising a casing having two slots arranged at substantially right angles to each other and joined at one end, a lever pivoted in said casing and having a normal position in one of said slots at a distance from the junction of said slots and adjacent one side of said one slot, said one slot being relatively wide providing for movement of said lever transversely thereof, said lever being manually movable from said normal position to any selected position in said one slot, and valve means controlled by said lever for controlling the pressure of fluid in said pipe, said lever conditioning said valve means to completely vent said pipe in normal position and to provide a pressure in said pipe upon movement out of normal position which varies in accordance with the extent of such movement in said one slot, the pressure in said pipe being effective to automatically return said lever through said one slot to neutral position when relieved of manual pressure, said lever being movable from said one slot into the other slot for securing said lever against movement by the pressure of fluid in said pipe.

2. A controller for selectively controlling the pressure of fluid in a plurality of pipes comprising a casing having a relatively wide slot and a locking notch open to said slot at each end, a lever pivoted in said casing and extending through said slot and capable of movement transversely of said slot, said lever having a neutral position intermediate the ends and adjacent one side of said slot and being movable longitudinally of said slot in either direction to either end of said slot and from either end of said slot into the respective locking notch, valve means for controlling the pressure of fluid in said pipes conditionable with said lever in neutral position to open said pipes to the atmosphere and operative by said lever upon movement in said slot in one direction from neutral position to provide a fluid pressure in one of said pipes of a degree which varies according to the position of said lever in said slot from neutral position, said valve means being operative by said lever upon movement in said slot from neutral position in the opposite direction to provide a fluid pressure in another of said pipes of a degree dependent upon the position of said lever from neutral position, the pressure of fluid supplied to said pipes reacting on said lever to automatically return same to neutral position, said lever being movable into one or the other of said notches for holding same against movement by the fluid pressure in the respective pipe.

3. A controller for selectively controlling the pressure of fluid in a plurality of pipes comprising a casing having a rectangular slot, a lever pivoted in said casing and extending through said slot, and having a normal position adjacent one side of said slot, valve means controlled by said lever for controlling the pressure of fluid in said pipes and conditionable in said normal position of said lever to open said pipes to the atmosphere, said lever being operative upon movement from normal position in a plane toward one end of said slot to actuate said valve means to provide a pressure in one of said pipes which varies with the extent of such movement and being operative upon movement in a direction away from said one side at right angles to said plane regardless of its position between normal position and said one end to actuate said valve means to supply fluid under pressure to another of said pipes, the fluid pressure supplied to said pipes reacting on said lever for automatically returning same to said plane and to normal position for releasing fluid under pressure from said pipes, said cover having a notch open through said one side of said slot adjacent said one end adapted to receive said lever in the position providing for a maximum degree of pressure in said one pipe and the opening of said other pipe to atmosphere for holding same against movement to neutral position by the pressure of fluid acting in said one pipe.

4. A controller for selectively controlling the pressure of fluid in a plurality of pipes comprising a casing having a slot, valve means in said casing operative to vary the pressure of fluid in said pipes, a lever pivotally mounted in said casing for actuating said valve means, said lever extending through said slot and having a neutral position therein for releasing fluid under pressure from said pipes, and being operative upon movement from neutral position in the direction of one end of said slot to effect operation of said valve means to supply fluid to one of said pipes at a pressure which varies in accordance with the extent of such movement, said lever at said one end of said slot being movable in a direction at right angles to said one direction for actuating said valve means to vary the pressure of fluid in said other pipe, the pressure of fluid in said pipes being reactive on said lever tending to actuate same to release fluid under pressure from said pipes, and means operative to releasably hold said lever adjacent said one end of slot against the reaction of the fluid pressure in said one pipe.

5. A controller for selectively controlling the pressure of fluid in a plurality of pipes comprising a casing having a slot, valve means in said casing operative to vary the pressure of fluid in said pipes, a lever pivotally mounted in said casing for actuating said valve means, said lever extending through said slot and having a neutral position therein for releasing fluid under pressure from said pipes, and being operative upon movement from neutral position in the direction of one end of said slot to effect operation of said valve means to supply fluid to one of said pipes at a pressure which varies in accordance with the extent of such movement, said lever at said one end of said slot being movable in a direction at right angles to said one direction for actuating said valve means to vary the pressure of fluid in said other pipe, the pressure of fluid in said pipes being reactive on said lever tending to actuate same to release fluid under pressure from said pipes, a notch in said cover open to said slot at said one end and providing for movement of said lever in a direction opposite that for supplying fluid under pressure to said other pipe, said notch being arranged to hold said lever in the position providing fluid under pressure in said one pipe against the reaction of such fluid pressure.

6. A controller for selectively controlling the pressure of fluid in a plurality of pipes comprising a casing having two slots arranged at right angles to each other and joined at one end, valve means in said casing for supplying and releasing fluid under pressure to and from said pipes, a lever for controlling said valve means, said lever being pivoted in said casing and rockable in paths defined by said slots, said lever having a normal position at the end of one slot opposite the junction with the other slot for conditioning said valve means to open said pipes to the atmosphere and being operative upon movement in said one slot away from normal position to supply fluid to one of said pipes at a pressure depending upon the extent of such movement and for maintaining the other pipe open to the atmosphere and being then movable into the other slot for supplying fluid under pressure to said other pipe and for at the same time maintaining the supply of fluid to said one pipe, the pressure of fluid in said pipes reacting on said lever to actuate same to release fluid under pressure from said pipes, and manually releasable interlocking means associated with said lever and casing at the junction of said slots for securing said lever against movement by the pressure of fluid in said one pipe.

7. A controller for selectively controlling the pressure of fluid in a plurality of pipes comprising a casing having a U-shaped opening, valve means in said casing for supplying and releasing fluid under pressure to and from said pipes, a lever pivoted in said casing rockable in one plane from a normal position to actuate said valve means to provide a fluid pressure in one of said pipes of a degree dependent upon the position from normal position and rockable at right angles to said plane to provide a fluid pressure in another of said pipes, said lever extending through said slot which defines the directions of movement of said lever, the movement in said plane being through the base portion of said slot and said normal position being at the junction of one end of said base portion and one leg of said slot, the fluid pressure in said pipes reacting on said lever tending to actuate same to release fluid under pressure from said pipes, and manually releasable interlocking means on said lever and in said casing at the junction of said base portion and the said other leg of said slot for holding said lever against the pressure of fluid in said one pipe.

8. A controller comprising a casing having a plain surface, valve means in said casing including an actuating member which is operative by force to effect operation of said valve means to supply fluid at a pressure proportional to said force and which is subject to the pressure of fluid supplied by said valve means opposing said force, a lever having a normal position with respect to said surface for relieving said member of force and manually rockable therefrom relative to said surface to apply force to said member to a degree which increases with the extent of movement of said lever from normal position, a friction element carried by said lever and slidable on said surface upon all movement of said lever, and a spring acting on said element urging same into contact with said surface, said surface being so formed with respect to the relative angularity of said lever in positions out of said neutral position that the friction between said element and surface will hold said lever in any position relative to said surface.

9. A controller comprising a casing having a plain surface, valve means in said casing including an actuating member which is operative by force to effect operation of said valve means to supply fluid at a pressure proportional to said force and which is subject to the pressure of fluid supplied by said valve means opposing said force, a lever having a normal position with respect to said surface for relieving said member of force and manually rockable therefrom relative to said surface to apply force to said member to a degree which increases with the extent of movement of said lever from normal position, a friction element carried by said lever and slidable on said surface upon all movement of said lever, and a spring acting on said element urging same into contact with said surface, said surface being so formed with respect to the relative angularity of said lever in positions out of said neutral position that the friction between said element and surface will hold said lever in any position relative to said surface, said surface being provided interiorly of said casing, said element being slidably mounted on said lever inside of said casing, and said spring being carried by said lever and acting on said element urging same into contact with said surface.

10. A controller comprising a casing having a plain surface, valve means in said casing including an actuating member which is operative by force to effect operation of said valve means to supply fluid at a pressure proportional to said force and which is subject to the pressure of fluid supplied by said valve means opposing said force, and a lever having a normal position with respect to said surface for relieving said member of force and manually rockable therefrom relative to said surface to apply force to said member to a degree which increases with the extent of movement of said lever from normal position, a friction element carried by said lever and slidable on said surface upon all movement of said lever, and a spring acting on said element urging same into contact with said surface, said surface being so formed with respect to the relative angularity of said lever in positions out of said neutral position that the friction between said element and surface will hold said lever in any position relative to said surface, said surface being a flat interior surface of said casing formed at right angles to the axis of said lever when in normal position.

11. A controller comprising a casing, valve means in said casing, a lever pivotally mounted in said casing and connected to said valve means and operative upon rocking relative to a plain surface in said casing to actuate said valve means, a member carried by said lever adapted to frictionally engage said surface in all positions of said lever in said casing, and a spring carried by said lever and acting on said member urging same into frictional contact with said surface, friction between said member and surface being operative to hold said lever in any chosen operating position with respect to said surface without manual force.

12. A controller comprising a casing having a rectangular opening, a lever pivotally mounted at one end in said casing and extending through said opening and having a normal position intermediate the ends and adjacent one side of said opening, valve means in said casing including actuating means operative by said lever upon rocking from normal position in either direction lengthwise of said opening or upon rocking crosswise of said slot to supply fluid under pressure which acts on said actuating means in opposition to the force applied by said lever, a friction element slidably mounted on said lever adapted to frictionally engage a surface on said casing, a spring on said lever urging said member into contact with said surface, said surface being so formed with respect to any relative angular position which the lever may assume lengthwise of the slot and adjacent said one side as to secure said lever in such position without manual effort, and said surface being so formed transversely of the slot as to render said friction element ineffective to hold said lever in any position crosswise of said slot.

13. A controller comprising a casing having a rectangular opening, a lever pivotally mounted at one end in said casing and extending through said opening and having a normal position intermediate the ends and adjacent one side of said opening, valve means in said casing including actuating means operative by said lever upon rocking from normal position in either direction lengthwise of said opening or upon rocking crosswise of said slot to supply fluid under pressure which acts on said actuating means in opposition to the force applied by said lever, a friction element slidably mounted on said lever adapted to frictionally engage a surface on said casing, a spring on said lever urging said member into contact with said surface, said surface being formed interiorly of the casing and being plain and extending lengthwise of said opening at right angles to the axis of said lever when in neutral position, and said surface being curved transversely of said opening whereby frictional contact between said friction element and surface will maintain said lever in any chosen position lengthwise of the slot adjacent said one side against the opposing pressure of fluid on said actuating means, and whereby such opposing pressure will automatically move said lever crosswise of said opening in the direction of said one side.

14. A controller comprising a casing, valve means in said casing including an actuating member operative by force to effect operation of said valve means to supply fluid at a pressure proportional to said force and which is subject to the pressure of said fluid opposing said force, a lever pivoted in said casing and rockable in a plane from a normal position to apply force to said actuating member of a degree proportional to the degree of movement from normal position, a friction disk slidably mounted axially on said lever, said casing having at one side of said lever only, a plain surface extending parallel to said plane for engagement by said disk and so arranged that friction between said surface and disk will hold said lever in any position out of neutral against the opposing fluid pressure on said actuating member, a spring urging said disk into contact with said surface, and means securing said disk against turning on said lever to obtain sliding friction between said disk and surface.

15. A controller comprising a casing, a lever pivotally mounted in said casing and adapted to be rocked from a normal position, a cam on said lever having a straight cam surface flaring outwardly from the axis of said lever in the direction of the lever pivot, and valve means in said casing including an operating member engaging said surface and adapted to be displaced thereby upon rocking of said lever from normal position to effect operation of said valve means to supply fluid at a pressure which varies in accordance with the degree of such displacement.

16. A controller comprising a casing, a lever pivotally mounted in said casing and adapted to be rocked from a normal position, a conical shaped cam on said lever arranged in concentric relation therewith and with the base end adjacent the pivoted end of said lever, and two spaced valve means in said casing each including an operating member engaging said surface in the normal position of said lever, said lever being adapted upon rocking in one direction from normal position to operate said cam to actuate one of said members to effect operation of the valve means controlled thereby to supply fluid under pressure, and said lever being rockable in another direction from normal position to actuate said cam for effecting operation of the other operating member to operate the other valve means to supply fluid under pressure.

17. A controller comprising a casing, a lever pivotally mounted in said casing and adapted to be rocked from a normal position, a conical shaped cam on said lever arranged in concentric relation therewith and with the base end adjacent the pivoted end of said lever, and two spaced valve means in said casing each including an operating member engaging said surface in the normal position of said lever, said lever being adapted upon rocking in one direction from normal position to operate said cam to actuate one of said members to effect operation of the valve means controlled thereby to supply fluid under pressure, and said lever being rockable in another direction from normal position to actuate said cam for effecting operation of the other operating member to operate the other valve means to supply fluid under pressure, said cam when operating one of said members moving out of contact with the other member, and means for maintaining the said other member in position for reengagement with said cam upon return of said lever and cam to normal position.

18. A controller comprising a casing, two independent valve mechanisms in said casing each including a member adapted to be displaced to effect operation of the valve mechanism to supply fluid at a pressure dependent upon the degree of such displacement, a lever pivotally mounted at one end in said casing, a conical shaped cam provided on the said lever in concentric relation therewith with the larger and flat end of the cam disposed adjacent the pivoted end of said lever, a bell crank pivoted in said casing having one end engaging one of said members and the other end in contact with said cam adjacent the larger end thereof with said handle in a neutral position, another bell crank pivotally mounted in said casing and having one end contacting the other of said members and its other end in contact with said cam adjacent its larger end with said handle in neutral position, said lever being operative upon rocking in the direction of either of said bell cranks to effect operation thereof for displacing the associated valve operating member and when so operated said cam being movable out of engagement with the other bell crank, and adjustable means engaging one of said bell cranks for maintaining same in condition for reengagement by said cam upon return of said lever to neutral position after operating the other bell crank.

19. A controller comprising a casing, two independent valve mechanisms in said casing each including a member adapted to be displaced to effect operation of the valve mechanism to supply fluid at a pressure dependent upon the degree of such displacement, a lever pivotally mounted at one end in said casing, a conical shaped cam provided on the said lever in concentric relation therewith with the larger and flat end of the cam disposed adjacent the pivoted end of said lever, a bell crank pivoted in said casing having one end engaging one of said members and the other end in contact with said cam adjacent the larger end thereof with said handle in a neutral position, another bell crank pivotally mounted in said casing and having one end contacting the other of said members and its other end in contact with said cam adjacent its larger end with said handle in neutral position, said lever being operative upon rocking in the direction of either of said bell cranks to effect operation thereof for displacing the associated valve operating member and when so operated said cam being movable out of engagement with the other bell crank, and adjustable means engaging one of said bell cranks for holding the said member controlled thereby under a chosen degree of displacement and for also maintaining the last named bell crank positioned to permit return movement of said lever to neutral position after operating the other bell crank.

20. A controller comprising a casing, a lever pivotally mounted at one end in said casing, a plurality of valve means arranged in a circle around the pivoted connection of said lever in said casing, each of said valve means including a displaceable member operative upon displacement to effect operation of the valve means to supply fluid at a pressure which varies in accordance with the degree of such displacement, a cone shaped cam on said lever arranged with its larger end adjacent the pivoted end of said lever and adapted to be engaged by the several displaceable members with said handle in neutral position, said handle being operative upon movement in the direction of any selected one of said valve means to actuate said cam to operate the selected valve means, said cam when operating a selected valve means being movable out of contact with the displaceable member of another valve means, and means for maintaining said displaceable member in position for reengagement by said cam upon return of said lever to neutral position.

21. A controller comprising valve means for controlling the pressure of fluid in a receiver, a displaceable member for operating said valve means to vary the pressure of fluid in said receiver in accordance with the degree of displacement of said member from a normal position which provides for complete venting of fluid under pressure from said receiver, said member being subject to the pressure of fluid supplied by said valve means which acts to return said member to normal position, a manually operative cam for displacing said member from normal position and conditionable to provide for movement of said member to said normal position, and means adjustable to engage said member for holding same in a position of chosen displacement upon movement of said cam to the position which provides for movement of said member to normal position.

22. A controller for selectively controlling the pressure of fluid in a plurality of pipes comprising a casing having a slot, valve means in said casing operative to vary the pressure of fluid in said pipes, a lever pivotally mounted in said casing for actuating said valve means, said lever extending through said slot and having a neutral position therein for releasing fluid under pressure from said pipes, and being operative upon movement from neutral position in the direction of one end of said slot to effect operation of said valve means to supply fluid to one of said pipes, said lever at said one end of said slot being movable in a direction at right angles to said one direction for actuating said valve means to vary the pressure of fluid in said other pipe, the pressure of fluid in said pipes being reactive on said lever tending to actuate same to release fluid under pressure from said pipes, and means operative to releasably hold said lever adjacent said one end of the slot against the reaction of the fluid pressure in said one pipe.

23. A controller comprising a casing, a lever pivotally mounted in said casing and adapted to be rocked from a normal position, a cam on said lever having a straight cam surface flaring outwardly from the axis of said lever in the direction of the lever pivot, and valve means in said casing including an operating member engaging said surface and adapted to be displaced thereby upon rocking of said lever from normal position to effect operation of said valve means.

RANKIN J. BUSH.
WILLIAM H. GLASS.